US011370022B2

(12) United States Patent
Sethi et al.

(10) Patent No.: US 11,370,022 B2
(45) Date of Patent: Jun. 28, 2022

(54) METHOD FOR THE SYNTHESIS OF A ZERO-VALENT METAL MICRO- AND NANOPARTICLES IN THE PRESENCE OF A NOBLE METAL

(71) Applicant: POLITECNICO DI TORINO, Turin (IT)

(72) Inventors: Rajandrea Sethi, Turin (IT); Carlo Bianco, Turin (IT); Andrea Gallo, Turin (IT); Tiziana Anna Elisabetta Tosco, Turin (IT); Alberto Tiraferri, Turin (IT)

(73) Assignee: POLITECNICO DI TORINO, Turin (IT)

( * ) Notice: Subject to any disclaimer, the term of this patent is extended or adjusted under 35 U.S.C. 154(b) by 48 days.

(21) Appl. No.: 16/767,358

(22) PCT Filed: Nov. 27, 2018

(86) PCT No.: PCT/IB2018/059337
§ 371 (c)(1),
(2) Date: May 27, 2020

(87) PCT Pub. No.: WO2019/106526
PCT Pub. Date: Jun. 6, 2019

(65) Prior Publication Data
US 2020/0384530 A1 Dec. 10, 2020

(30) Foreign Application Priority Data
Nov. 28, 2017 (IT) .................. 102017000136603

(51) Int. Cl.
B22F 9/24 (2006.01)
B22F 1/054 (2022.01)
(Continued)

(52) U.S. Cl.
CPC .............. B22F 1/054 (2022.01); B22F 1/105 (2022.01); B22F 9/24 (2013.01);
(Continued)

(58) Field of Classification Search
None
See application file for complete search history.

(56) References Cited

U.S. PATENT DOCUMENTS

2003/0039857 A1 2/2003 Zhang
2010/0047546 A1* 2/2010 Malshe .................. C23C 18/40
428/221

(Continued)

FOREIGN PATENT DOCUMENTS

WO 2004105984 A1 12/2004
WO 2009140694 A2 11/2009

OTHER PUBLICATIONS

International Search Report for PCT/IB2018/059337 dated May 9, 2019.

(Continued)

Primary Examiner — George Wyszomierski
(74) Attorney, Agent, or Firm — Thomas | Horstemeyer, LLP

(57) ABSTRACT

The invention regards a method for the synthesis of Zero-Valent metal micro- and nanoparticles, in which a first aqueous solution ($SOL_1$) of a salt of a noble metal (A) is mixed with a third neutral or basic aqueous solution ($SOL_3$) of an inorganic sulphur-based reducing agent (C), and wherein the mixture thus obtained is added to a second aqueous solution ($SOL_2$) of a salt of a transition metal (B) and a second aliquot of the inorganic reducing agent; such method provides that the amount of the inorganic reducing agent (C) is in a stoichiometric excess in the reduction reaction to Zero-Valent of both the salt of the noble metal (Continued)

(A) contained in the first solution ($SOL_1$) and the salt of the transition metal (B) contained in the second solution ($SOL_2$). The invention also regards Zero-Valent micro and nanoparticles, preferably bimetallic, obtained with the above method. More generally, the invention regards a method for reduction of a transition metal (B) to Zero-Valent metal by an inorganic reducing agent (C), by prior or concurrent reduction of a noble metal (A), wherein the amount of inorganic reducing agent (C) is in stoichiometric excess in the reduction reaction to Zero-Valent of both the noble metal (A) and the transition metal (B). The present invention finds preferred and advantageous application in the remediation and/or the treatment of contaminated water containing at least one polluting substance. The preferred embodiment of the present invention provides that the noble metal (A) is silver, that the transition metal (B) is iron and/or manganese, and the inorganic reducing agent (C) is chosen from borohydrides, dithionites and bisulphites.

16 Claims, 5 Drawing Sheets

(51) Int. Cl.
*B22F 1/105* (2022.01)
*B82Y 30/00* (2011.01)
*B82Y 40/00* (2011.01)

(52) U.S. Cl.
CPC ..... *B22F 2304/054* (2013.01); *B22F 2304/10* (2013.01); *B82Y 30/00* (2013.01); *B82Y 40/00* (2013.01)

(56) References Cited

U.S. PATENT DOCUMENTS

| | | | |
|---|---|---|---|
| 2010/0155310 A1* | 6/2010 | Enomura | C09B 67/0022 209/668 |
| 2011/0256383 A1* | 10/2011 | Cochet | C08K 3/10 428/328 |
| 2014/0301892 A1* | 10/2014 | Maekawa | B82Y 30/00 420/497 |
| 2015/0283616 A1* | 10/2015 | Maekawa | C22B 11/04 75/370 |
| 2018/0175382 A1* | 6/2018 | Chou | H01M 10/05 |

OTHER PUBLICATIONS

Muhammad Daud, et al. Comparing and Optimizing Nitrate Adsorption from Aqueous Solution Using Fe/Pt Bimetallic Nanoparticles and Anion Exchange Resins, Journal of Nanotechnology, vol. 2015, Jan. 1, 2015, pp. 1-7.

* cited by examiner

```
┌─────────────────────────────────────────────────────────────────────┐
│ preparing a first aqueous solution SOL₁ of a noble metal A salt,    │
│ said first solution being degassed or naturally oxygenated          │ — 100
└─────────────────────────────────────────────────────────────────────┘
                                   ⇩
┌─────────────────────────────────────────────────────────────────────┐
│ preparing a second aqueous solution SOL₂ of a transition metal B    │
│ salt, said second solution being degassed or naturally oxygenated   │ — 101
└─────────────────────────────────────────────────────────────────────┘
                                   ⇩
┌─────────────────────────────────────────────────────────────────────┐
│ preparing a third neutral or basic aqueous solution SOL₃, said      │
│ third solution being degassed or naturally oxygenated, of an        │
│ inorganic sulphur-based reducing agent C in stoichiometric excess   │ — 102
│ with respect to the reduction reaction to Zero-Valent of the total  │
│ amount of the metals A e B contained in SOL₁ and in SOL₂            │
└─────────────────────────────────────────────────────────────────────┘
                                   ⇩
┌─────────────────────────────────────────────────────────────────────┐
│ in the presence of natural atmosphere or controlled atmosphere,     │
│ mixing said first solution SOL₁ and an aliquot of said third        │
│ solution SOL₃, wherein the amount of said third solution is         │
│ determined to obtain that the amount of the inorganic reducing      │ — 103
│ agent C is in stoichiometric excess in the reduction reaction to    │
│ Zero-Valent of the salt of the noble metal A contained in the first │
│ solution SOL₁, thus obtaining a suspension of micro- and            │
│ nanoparticles of noble metal A                                      │
└─────────────────────────────────────────────────────────────────────┘
                                   ⇩
┌─────────────────────────────────────────────────────────────────────┐
│ adding said second solution SOL₂ and a second aliquot of said third │
│ solution SOL₃ to the mixture obtained in the previous step 103,     │
│ wherein the amount of said third solution is determined to obtain   │
│ that the amount of the inorganic reducing agent C within the        │ — 104
│ mixture is in stoichiometric excess in the reduction reaction to    │
│ Zero-valent of the transition metal (B) salt contained in the       │
│ second solution SOL₂, and mixing, thus obtaining a suspension of    │
│ Zero-Valent micro- and nanoparticles, at least of the transition    │
│ metal B                                                             │
└─────────────────────────────────────────────────────────────────────┘
```

Fig. 1

Dye before the addition of nanoparticles

Degraded dye after 80 min from the addition of nanoparticles

METHOD FOR THE SYNTHESIS OF A ZERO-VALENT METAL MICRO- AND NANOPARTICLES IN THE PRESENCE OF A NOBLE METAL

CROSS-REFERENCE TO RELATED APPLICATIONS

This application is the 35 U.S.C. § 371 national stage application of PCT Application No. PCT/IB2018/059337, filed Nov. 27, 2018, where the PCT claims priority to, and the benefit of, Italian application no. 102017000136603, filed Nov. 27, 2017, both of which are herein incorporated by reference in their entireties.

TECHNICAL FIELD

The present invention relates generally to the field of anti-pollution and more specifically to the field of remediation of contaminated aquifers and the treatment of wastewater.

The present invention has the object of providing a method for the synthesis of Zero-Valent metal micro- and nanoparticles, and also the Zero-Valent micro and nanoparticles, preferably bimetallic, obtained with such method.

More generally, the present invention has the object of providing a method for the reduction of a transition metal to a Zero-Valent metal.

Other areas of application of the present invention, in addition to the remediation of contaminated sites and the treatment and disinfection of wastewater, are the creation of filtering supports for the treatment and disinfection of air flows as well as the production of material for the manufacture of electrodes, semiconductors, catalytic film and/or adsorbents.

State of the Art

In the specific context of application, namely within the context of remediation of contaminated aquifers, "nanoremediation" has gradually imposed itself among in situ treatments as a competitive and cutting-edge technology, designed to replace traditional techniques, often less effective or convenient; "nanoremediation" means the underground injection of aqueous suspensions of reactive micro- and nanoparticles in order to induce in situ degradation, transformation and/or immobilization of pollutants.

The micro- and nanoparticles used for remediation can have a different composition, depending on the contaminant and on the site to be treated; some nanomaterials proposed for the remediation of contaminated aquifers include nanoparticles of metallic iron, iron oxides or sulphides, bimetallic materials, composite materials based on a Zero-Valent metal and a non-metallic support (activated carbon, zeolites), emulsified nanoparticles; the nanomaterials of main interest within the context of remediation of contaminated sites are definitely those Zero-Valent iron-based that showed, in recent years, an excellent potential in treating many challenging contaminants, both organic (chlorinated hydrocarbons) and inorganic (heavy metals) thanks to their high specific surface, determined by the micrometric or nanometric sizes, that significantly increases their reactivity.

Current methods for the production of micro- and nanoparticles of Zero-Valent metals, and in particular of microscopic and nanoscopic Zero-Valent iron, are either thermal reduction processes for the massive production of reactant material, or chemical reduction ones, limited to the laboratory-scale applications.

Manufacturing processes for thermal reduction consist in the reduction of solid material (for example iron and manganese oxides, and the like) performed by gaseous hydrogen or another solid reductant (e.g. coal) at high temperature (200-2,000° C.); such processes are highly energy-intensive, and the produced material has a high cost. Examples of above-mentioned processes are illustrated in the patent documents U.S. Pat. Nos. 2,426,148, 4,146,389, 6,974,493 and EP1957683.

Examples of above-mentioned processes are also illustrated in the following scientific literature:

"Thermal Reduction Route to the Fabrication of Coaxial Zn/ZnO Nanocables and ZnO Nanotubes" J. Q. Hu, Q. Li, X. M. Meng, C. S. Lee, S. T. Lee, and "Promotional effect of noble metals addition to cobalt fisher-tropsch synthesis catalyst, Dongyang Xu, Ping Dai, Qingjie Guo, Wenzhao Li.

The limits and disadvantages of such processes are linked to the complexity of synthesis conditions and of the equipment required for a correct execution of the process.

In particular, with regard to the examples described in the patent documents, namely in U.S. Pat. No. 2,426,148 and in U.S. Pat. No. 6,974,493, they exhibit a high complexity of the process and of the equipment required for the development of the reduction, as well as a high energy demand, which leads to high operating costs.

Furthermore, with respect to the examples presented in the scientific literature, the process proposed by Hu et al. involves the use of a furnace that works at a pressure lower than the atmospheric one, in a controlled atmosphere under argon and hydrogen, and at temperatures exceeding 1,000° C., while the process proposed by Xu et al. uses two separate high-temperature reductions for the cobalt and for the noble metal, with the consequent disadvantages already mentioned.

The above processes known from the scientific literature, while allowing to obtain materials with suitable characteristics, have disadvantages in terms of industrial-scale applications, due to the difficulties of both realization and operation of such systems; furthermore, in order to obtain micro- and nanoparticles according to these processes, the material grinding should be adopted.

In laboratory applications, the particles of Zero-Valent metals are mainly produced by chemical reduction of organic or inorganic metal salts by compounds with a high reducing power.

More particularly, the chemical reduction of Zero-Valent iron is generally realised by sodium borohydride, $NaBH_4$; such process leads to the rapid production of Zero-Valent metals, but generates large quantities of gaseous hydrogen (highly flammable, at risk of explosion) and waste characterized by the presence of toxic and/or carcinogenic by-products (e.g., borates); furthermore, this process turns out to be economically unattractive because of the high cost of the reducing agent used, $NaBH_4$, and the cost of treatment and disposal of the waste produced during the synthesis step.

As an alternative to sodium borohydride, $NaBH_4$, the use of reducing compounds with a lower environmental impact has been proposed, such as dithionites or plant extracts; these materials have a significantly lower cost than $NaBH_4$, with a consequent notable reduction in the unit cost of the Zero-Valent iron produced, but the use of these reagent materials requires that the reduction takes place in sealed reactors, in the presence of deaerated water and modified atmosphere with a low oxygen content, an aspect which strongly limits the practicality and scalability for large-scale production.

Sometimes, Zero-Valent iron particles produced by the above-mentioned processes are doped with noble metals in trace amounts, mostly platinum, in order to increase their effectiveness of contaminant removal and to reduce considerably the total time, since the noble metal acts as a catalyst for the reduction and dehalogenation reactions of many challenging polluting compounds; the functionalization with precious metals, which is usually performed downstream the Zero-Valent iron synthesis, however, generates an increase in the unit cost of the Zero-Valent iron.

Examples of processes for the production by chemical reduction of the above micro- and nanoparticles for the remediation of contaminated sites are illustrated in patent documents WO2014209850, U.S. Pat. No. 8,283,034, WO2013133509, EP2995374, U.S. Pat. No. 6,875,253, US2003121364, EP2125271, WO2009140694 and WO02062509.

Examples of processes for the production by chemical reduction of the above-mentioned micro- and nanoparticles for remediation of contaminated sites are also illustrated in the following scientific publications:
"Environmentally Benign Synthesis Methods of Zero-Valent Iron Nanoparticles", Gabor Kozma, Andrea Rónavári, Zoltan Kónya, and Ákos Kukovecz, ACS Sustainable Chemistry & Engineering 2016 4 (1), 291-297, DOI:10.1021/acssuschemeng.5b01185;
"Facile Synthesis and Characterization of Fe/FeS Nanoparticles for Environmental Applications", Eun-Ju Kim, Jae-Hwan Kim, Abdul-Majeed Azad, and Yoon-Seok Chang, ACS Applied Materials & Interfaces 2011 3 (5), 1457-1462, DOI:10.1021/am200016v;
"Nanoscale Zero-Valent iron and bimetallic particles for contaminated site remediation", Denis O'Carroll, Brent Sleep, Magdalena Krol, Hardiljeet Boparai, Christopher Kocur, Advances in Water Resources, Volume 51, January 2013, Pages 104-122, ISSN 0309-1708;
"Reductive reactivity of borohydride- and dithionite-synthesized iron-based nanoparticles: A comparative study", Xiaoming Ma, Di He, Adele M. Jones, Richard N. Collins, T. David Waite, Journal of Hazardous Materials, Volume 303, 13 Feb. 2016, Pages 101-110, ISSN 0304-3894;
"Comparing and Optimizing Nitrate Adsorption from Aqueous Solution Using Fe/Pt Bimetallic Nanoparticles and Anion Exchange Resins", Muhammad Daud, Zahiruddin Khan, Aisha Ashgar, M. Ihsan Danish, and Ishtiaq A. Qazi, Journal of Nanotechnology, vol. 2015, Article ID 985984, page 7, 2015; and
"Study of silver precipitation in thiosulphate solutions using sodium dithionite. Application to an industrial effluent", Rivera, A. Roca, M. Cruells, F. Patiño, E. Salinas, Hydrometallurgy, Volume 89, Issues 1-2, September 2007, Pages 89-98, ISSN 0304-386X.

As discussed above, the main limits and the disadvantages of the above-mentioned processes reside mainly in high production costs, the need to use degassed water and inert atmosphere, the production of toxic compounds and/or at high risk for human health.

In particular, patent documents US2003121364 and WO02062509 perform at high temperature using organic solvents; on the other hand, the document EP2125271 uses a "liquid crystal" step that requires strict conditions, which complicate the synthesis process.

The publication by Muhammad et al. reports the synthesis of Zero-Valent iron particles decorated with palladium inserts by means of chemical reduction by sodium borohydride (a toxic reagent) in the presence of an inert atmosphere and a mixed solution of water and ethanol.

The patent document U.S. Pat. No. 8,283,034 proposes the use of sodium dithionite for the chemical reduction of metals to the Zero-Valent state. However, this process requires to implement the particle synthesis in the presence of a controlled atmosphere, depleted in oxygen. This makes the synthesis procedure technologically complex due to the need of using pressurized reactors. Actually, scientific publications by Kozma et al. and Ma et al show that the materials produced with dithionite in a non-inert atmosphere have a Zero-Valent iron fraction significantly lower than that found in materials produced with borohydride.

Instead, the patent document WO2009140694 proposes the use of plant extracts, like fruit or other plants, like organic reducing agents to reduce metals to the Zero-Valent state. Such plant extracts actually contain polyphenols and other organic reducing agents, potentially capable of operating the reduction of metals to the Zero-Valent state. However, the content of the organic reducing agent, and the quality of the same are extremely variable within the plant extracts. Therefore, the quantity and quality of the Zero-Valent metal produced are not always satisfactory and compatible with the specific application. In addition, the additional organic substances naturally present in fruit extracts can be adsorbed on the metallic particle surface, limiting the reactivity against contaminant substances.

Therefore, there is a perceived need to synthesize Zero-Valent micro- and nanoparticles in a quick and cost-efficient way and with a low environmental impact; also, the need to implement such synthesis in simple and easily scalable operating condition is felt.

More precisely, there is a perceived need to produce micro- and nanoparticles, preferably bimetallic ones, improving significantly their own performance in terms of contaminants removal.

In summary, therefore, up to the present time, to the knowledge of the Applicant, there aren't any known solutions which allow to synthesize Zero-Valent metal micro- and nanoparticles which overcome the above drawbacks.

Therefore, the Applicant, by the method according to the present invention, intends to remedy this lack.

OBJECTS AND SUMMARY OF THE INVENTION

The object of the present invention is to overcome the drawbacks of known art related to the synthesis of Zero-Valent metal micro- and nanoparticles intended for the remediation of contaminated aquifers and for wastewater treatment.

In particular, the present invention has the objectives of:
simplifying, optimizing and improving the production process for the chemical reduction of Zero-Valent metal-based nanomaterials, reducing the operational complexity and increasing the environmental compatibility thereof;
using widely commercially used inorganic reducing agents in order to obtain particles with a high content of Zero-Valent metals, and limit the possible absorption of organic macromolecules on the surface of metal particles, which may inhibit the reactivity thereof;
producing bimetallic particles composed of two (or more) Zero-Valent metals, preferably iron and silver.

Such objectives are achieved by the methods according to the present invention which, advantageously and thanks to the sequential or simultaneous reducing of a noble metal and a transition metal, in the presence of an inorganic sulphur-based reducing agent, in stoichiometric excess compared to the reduction reaction to Zero-valent both of the noble metal salt and the transition metal salt, allow to synthesize Zero-Valent micro- and nanoparticles, preferably bimetallic, consisting of a transition metal and a noble metal, more preferably consisting of Zero-Valent iron and silver with oxides and sulphides on their surface.

Specifically, the above and other objects and advantages of the invention, as will appear from the following description, are achieved with a method for the synthesis of Zero-Valent metal micro- and nanoparticles as that according to claim 1.

Moreover, the above and other objects and advantages of the invention are achieved with Zero-Valent micro- and nanoparticles like those according to claim 17.

Moreover, the above and other objects and advantages of the invention are achieved with a method for remediation and/or treatment of contaminated water containing at least a polluting substance, like that according to claim 21.

Moreover, the above and other objects and advantages of the invention are achieved with a method for reducing a transition metal to a Zero-Valent metal as that according to claim 24.

Preferred embodiments and variants of the method and micro- and nanoparticles according to the present invention form the subject matter of the dependent claims.

It is understood that all the appended claims form an integral part of the present description and that each of the technical characteristics claimed therein is possibly independent and can be used autonomously with respect to other aspects of the invention.

It will be immediately apparent that countless modifications could be made to what described (for example related to shape, sizes, arrangements and parts with equivalent functionalities) without departing from the scope of protection of the invention as claimed in the appended claims.

Advantageously, the technical solution according to the present invention allows:
  producing Zero-Valent metal micro- and nanoparticles by means of a chemical reduction of metal salts performed in extremely simplified operating conditions (usage of non-degassed water, open reactor) and without the use of $NaBH_4$, with consequent elimination of risks associated with the production of gaseous $H_2$ and the formation of borates;
  producing Zero-Valent metal micro- and nanoparticles by means of inorganic sulphur-based reducing agents, in order to ensure the production of particles having a high content of Zero-Valent metals, limit the use of organic reagents that may inhibit the particle reactivity, and create sulphurous layers on the surface of the particles which, as is known in the state of the art, improves their performance of remediation against some chlorinated contaminants;
  producing bimetallic micro- and nanoparticles, preferably consisting of iron and silver, with removal performance significantly better than those of the two single materials produced by means of the same synthesis process;
  obtaining, in the presence of silver, a material that combines the antibacterial and catalytic capabilities of silver with the reducing and adsorbent properties of the transition metal.

In addition, the technical solution according to the present invention shows the following advantages compared to known solutions:
  environmental benefit, linked to the use of a reducing agent at high environmental compatibility (inorganic sulphur-based reducing agents), which does not lead to the formation of toxic by-products, with consequent economic and social benefits associated;
  economic advantage, due to the use of inorganic sulphur-based reducing agents, whose extremely low cost can greatly reduce the unit cost of the Zero-Valent iron particles produced;
  technological advantage, thanks to the production of bimetallic particles consisting of a transition metal and a noble metal, which gives the produced particles excellent reducing properties against contaminants, catalysed by the presence of the noble metal, as well as antibacterial ones;
  technical and economic advantage, due to the fact that the addition of a noble metal to the Zero-Valent micro- and nanoparticles, which in the present invention has also the function of promoting the reduction of the transition metal (e.g. iron), occurs directly during the synthesis step of the micro- and nanoparticles themselves, allowing to further simplify the production process of functionalized particles;
  technical and economic advantage, due to the presence of the noble metal that promotes the reduction of the transition metal, linked to the possibility of performing the synthesis process in very simple operating conditions, without the need of degassing the solutions and generating a controlled atmosphere into the reactor.

Further objects and advantages of the present invention will be more apparent from the detailed description that follows.

BRIEF DESCRIPTION OF FIGURES

The present invention will be described hereinafter by way of some preferred embodiments, provided by way of example and not of limitation, with reference to the accompanying drawings. These drawings illustrate different aspects and examples of the present invention and, where appropriate, similar structures, components, materials and/or elements in different figures are denoted by similar reference numerals.

FIG. 1 is a flow diagram showing the steps of the method for the synthesis of Zero-Valent metal micro- and nanoparticles in the presence of a noble metal according to the present invention;

DETAILED DESCRIPTION OF THE INVENTION

Figure 2:
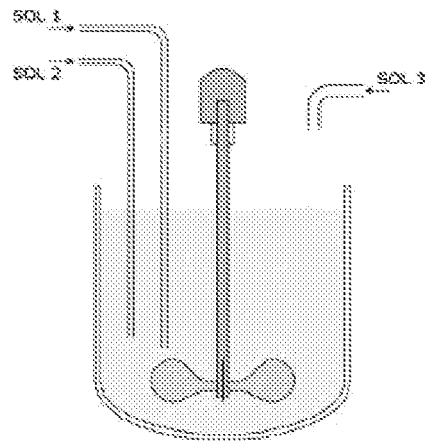
FIG. 2 is a schematic representation of the method of FIG. 1.

While the invention is susceptible to various modifications and alternative constructions, some preferred embodiments are shown in the drawings and will be described in detail hereinbelow.

It should be understood, however, that there is no intention to limit the invention to the specific embodiments illustrated, but, on the contrary, the invention is intended to cover all modifications, alternative constructions, and equivalents which fall within the scope of the invention as defined in the claims.

In the following description, therefore, the use of "for example", "etc.", "or", "either" indicates not exclusive alternatives without any limitation, unless otherwise indicated; the use of "also" means "including, but not limited to" unless otherwise indicated; the use of "includes/comprises" means "includes/comprises but not limited to" unless otherwise indicated.

The methods and the micro- and nanoparticles of the present invention are based on the innovative concept of the reduction of a transition metal in the aqueous phase by inorganic sulphur-based reducing agents mediated by the previous or simultaneous reduction of a noble metal.

Actually, the Inventors have surprisingly and unexpectedly found that the presence of a noble metal, even in extremely low concentrations, such as dissolved ion or as a micro- or nanometric sized metal, within a solution of an inorganic sulphur-based reducing agent promotes the reduction in aqueous solution of a transition metal, producing micro- and nanoparticles of the two metals, preferably bimetallic. In particular, the presence of the noble metal allows to obtain the reduction to Zero-Valent state of transition metals also using inorganic reducing agents, less strong than those commonly used (e.g., $NaBH_4$) that, in the absence of the noble metal itself, would not be able to perform the reduction to Zero-Valent state of the transition metal. An important feature of said methods and the micro- and nanoparticles resides in the fact that the reduction of the noble metal is previously realised as to the reduction of the transition metal, or simultaneously to it. The reduction of the noble metal, or the presence of its Zero-Valent micro- or nanoparticles, actually induces a general reduction of the redox potential of the solution. In addition, it is assumed that, on the surface of Zero-Valent noble metal micro- or nanoparticles, conditions extremely favourable to the reduction of the transition metal are established. Therefore, the presence of the noble metal promotes the consequent reduction of the transition metal also in the presence of inorganic reducing agents, less strong than those commonly used (for example, $NaBH_4$), at atmospheric temperature and pressure, in open reactors and in naturally oxygenated water. Finally, the micro- and nanoparticles produced according to the present invention can be bimetallic, resulting in improved performances of contaminant removal compared to monometallic micro- and nanoparticles produced by other processes.

In the present description, the term "noble metal" means copper, ruthenium, rhodium, palladium, silver, rhenium, osmium, iridium, platinum, gold and mercury. In the present description, the term "transition metal" means all the elements belonging to the groups 3 to 14 of the periodic table, with the exception of the metals already included in the class of noble metals according to the previous definition.

In the present description, the term "inorganic sulphur-based reducing agent" means sulphites, dithionites, bisulphites, metabisulphites, thiosulphates, or a mixture thereof.

In the present description, the term "naturally oxygenated" means solutions whose oxygen content has not been modified by means of gas insufflation, but is only related to the natural equilibrium with the ambient atmosphere, to the mixing and the agitation undergone by the solution.

In this description, the term "protocol" means the method of synthesis according to the present invention; the protocol according to the present invention provides for that an inorganic sulphur-based reducing agent is present in the reaction environment in stoichiometric excess; in its preferred embodiment, the method according to the present invention uses iron and/or manganese salts as transition metals, silver as a noble metal and an inorganic reducing agent belonging to the following classes: sulphites, dithionites, dithionates, bisulphites, metabisulphites, thiosulphates, or a mixture thereof.

In the present description, the term "operating conditions of the method according to the present invention" means any temperature and pressure conditions allowing the existence of a liquid phase; the method according to the present invention is capable of performing the reduction both in natural atmosphere and in a controlled atmosphere; the method according to the present invention can work in solutions both naturally oxygenated and degassed; the method according to the present invention requires to operate at a pH related to the chosen reducing agent, in particular, the pH should be such to stabilize and/or activate the reducing agent; in its preferred embodiment, the method according to the present invention provides for an alkaline pH.

In the present description, concerning pH ranges, the term "stabilisation" means the suppression of decomposition reactions of the reducing agent generally characterized by acid pH values; the optimal pH for such stabilization, as aforesaid, is related to the type of reducing agent used.

In the present description, the term "activation" refers to the most common reduction reactions involving the $HO^- \rightarrow H_2O$ process, and which are thus promoted by alkaline pH values ranging between pH 10 and pH 12; it is apparent that optimal pH values vary depending on the family of reducing agents used.

In the present description, the term "mixing time" means the time needed to homogenize the solutions and to promote contact among reagents, and dependent on several factors, such as the concentrations of the solutions at equal stoichiometric ratios.

In summary, the present invention relates to a method for the production of micro- and nanoparticles, preferably bimetallic, consisting of Zero-Valent metals, in which the two metals that make up the micro- and nanoparticles are a transition metal, preferably iron or manganese, and a noble metal, preferably silver; the method is carried out through the chemical reduction of metal salts by an inorganic sulphur-based reducing agent, preferably metabisulphite or dithionite, in extremely simple operating conditions; the synthesis product consists of an aqueous suspension of micro- and nanoparticles.

The main field of application of the present invention is related to, but not limited to the remediation of contaminated aquifers and/or to the modification of physico-chemical properties of the aquifers, with the ultimate goal of promoting the removal of pollutant by immobilization or transformation into harmless compounds; the field of application of the present invention may also relate to the production of a material for the production of electrodes, conductive surfaces, catalytic surfaces and/or adsorbents and the treatment of wastewater.

The preferred embodiment of the present invention is related to the synthesis of nanometric or microscopic Zero-Valent iron to use for the remediation of contaminated aquifers, for which known techniques are still either economically burdensome for a large-scale production or involve the use of reagents that produce toxic by-products, or do not lead to the realisation of a product with satisfactory technical characteristics.

An alternative embodiment of the present invention is related to the synthesis of all those composite materials which require the presence of a metallic component— consisting of a Zero-Valent metal—associated, coupled or embedded in other matrixes, in order to improve the technical characteristics thereof; some examples regarding the embedment of particles in a matrix of activated carbon, inorganic solid (e.g., zeolites) or porous polymer.

Another alternative embodiment of the present invention is related to the synthesis of micro- and nanoparticles in the presence of other materials having a supporting, stabilizing or dispersing function.

A first aspect of the present invention concerns the reduction to the Zero-Valent state of a metal belonging to the group of transition metals, preferably Fe(II) or Mn(II), in an aqueous solution and in a neutral or basic environment, by controlled mixing of a solution containing a salt of the metal itself and a solution containing an inorganic reducing agent having a low environmental impact and typically not strong enough to realise the reduction of the metal itself, preferably a metabisulphite ($S_2O_5^{2-}$) or dithionite ($S_2O_4^{2-}$) salt.

A second aspect of the present invention concerns the use of a noble metal, preferably Ag, in order to generate more favourable conditions for the reduction of the transition metal, whose reduction can then occur at ambient temperature and in the presence of oxygen, also by means of a not strong enough inorganic reducing agent; the reduction of the noble metal, much more rapid than that of the transition metal, locally generates redox potential conditions extremely favourable to the reduction to the Zero-Valent form of the transition metal, thus speeding up the reaction forming micro- and nanoparticles of transition metal and allowing to obtain the desired reduction, also in the presence of less strong reducing agents.

A third aspect of the present invention refers to the synthesis of bimetallic micro- and nanoparticles for reclamation, preferably consisting of iron (or manganese) and silver, whose removal efficiency in relation to contaminants is higher than that of the particles produced according to a similar protocol, but consisting of a single metal. Another aspect of the present invention concerns the formation of iron sulphides (due to the sulphurous nature of the reducing agent) on the surface of the bimetallic micro- and nanoparticles produced, which improve the relevant stability in the air and increase the adsorption and degradation property against many contaminants.

A final aspect of the present invention concerns the preparation of solutions of metal salts and reducing agent, and their mixing: the addition of the two solutions of metal salt in the reactor can be more or less simultaneous (in the case of non-simultaneous addition, it is preferable that the introduction of the noble metal occurs before that of the transition metal), as well as the addition of the inorganic reducing agent can occur before or after the addition of salts.

With reference to FIGS. 1 and 2, the method for the synthesis of a Zero-Valent metal micro- and nanoparticles according to the invention comprises the steps of:

preparing a first aqueous solution $SOL_1$ of a salt of a noble metal A, said first solution being degassed or naturally oxygenated (step 100);

preparing a second aqueous solution $SOL_2$ of a salt of a transition metal B, said second solution being degassed or naturally oxygenated (step 101);

preparing a third neutral or basic aqueous solution $SOL_3$, said third solution being degassed or naturally oxygenated, of an inorganic sulphur-based reducing agent C in stoichiometric excess with respect to the reduction reaction to Zero-Valent of the total amount of the metals A e B contained in $SOL_1$ and $SOL_2$ (step 102);

in the presence of a natural atmosphere or a controlled atmosphere, mixing said first solution $SOL_1$ and an aliquot of said third solution $SOL_3$, wherein the amount of said third solution is determined to obtain that the amount of the inorganic reducing agent C is in stoichiometric excess in the reduction reaction to Zero-Valent of the salt of the noble metal A contained in the first solution $SOL_1$, thus obtaining a suspension of micro- and nanoparticles of noble metal A (step 103);

adding said second solution $SOL_2$ and a second aliquot of said third solution $SOL_3$ to the mixture obtained in the previous step 103, wherein the amount of said third solution is determined to obtain that the amount of the inorganic reducing agent C within the mixture is in stoichiometric excess in the reduction reaction to Zero-valent of the salt of the transition metal B contained in the second solution $SOL_2$, and mixing, thus obtaining a suspension of Zero-Valent micro- and nanoparticles at least of the transition metal B (step 104).

According to a preferred embodiment of the invention, step 103 and step 104 occur simultaneously.

The method according to the present invention can also optionally include one or more of the following steps:
- mixing the suspension of micro- and nanoparticles with one or more stabilizing agents, such as organic and/or inorganic polymers, surfactants and/or polyelectrolytes, to improve the colloidal stability of said micro- and nanoparticles suspension;
- mixing the suspension of micro- and nanoparticles with one or more porous, organic and/or inorganic supports, such as activated carbons, zeolites, ceramic supports, etc., to modify the properties (e.g. chemical affinity and/or mobility) of said particles;
- carrying out said steps 103 and 104 in the presence of stabilising agents and/or porous supports, to modify the properties (e.g. chemical affinity and/or mobility) of said particles.

After the synthesis of micro- and nanoparticles of Zero-Valent metal according to the invention, one or more of the following steps may also be provided for:
- keeping the suspension under stirring for a period of time of at least 5 minutes;
- letting the Zero-Valent micro- and nanoparticles precipitate;
- removing the aqueous phase;
- washing the precipitated Zero-Valent micro- and nanoparticles with deionized water, wherein the amount of said deionized water and said micro- and nanoparticles are in a ratio of 1:1 volume/volume, or higher.

Preferably, during steps 103 and 104, the amount of the reducing inorganic agent C is greater than 0.1 times, more preferably ranges between 1 and 50 times, compared to the stoichiometric amount of the reaction of Zero-Valent reduction of both the salt of noble metal A contained in the first solution $SOL_1$ and the salt of transition metal B contained in the second solution $SOL_2$.

Some non-limiting examples of the metal reduction reactions are the following:

Reduction of $FeCl_2$ with $Na_2S_2O_4$

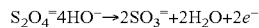

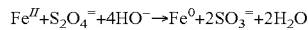

Given 100 ml of a 0.1 M solution of ferrous chloride, the stoichiometric amount (i.e. minimum) of reducing agent needed to complete the reaction results to be equal to 0.01 mol, corresponding to the addition of 100 ml of a 0, 1 M solution of $Na_2S_2O_4$; apparently, according to the present invention, the amount of reducing agent will be therefore higher.

Reduction of AgCl with $Na_2S_2O_4$

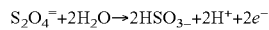

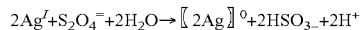

Given 100 ml of a 0.1 M solution of silver chloride, the stoichiometric quantity (thus, minimum) of reducing agent needed to complete the reaction results to be equal to 0.005 mol, corresponding to the addition of 50 ml of a 0.1 M solution of $Na_2S_2O_4$; apparently, according to the present invention, the amount of reducing agent will be therefore higher.

Preferably, the third solution $SOL_3$ has a pH value ranging between 6 and 14, more preferably between 8 and 13, still more preferably between 9 and 11.

Preferably, during step 102 and/or during said step 103 and/or during step 104, an acid or a base is added to reach or maintain the desired pH value.

Preferably, during step 104, the amounts of noble metal A and transition metal B have a molar ratio lower than 2, more preferably ranging between 1 and 0.0005, still more preferably ranging between 0.1 and 0.001.

Preferably, the amount of the first solution $SOL_1$ and the third solution $SOL_3$, during step 103, are in a ratio ranging between 1:0.01 and 1:100, but more preferably are in a ratio of 1:1.

Preferably, the amount of the mixture obtained in step 103 and of the second solution $SOL_2$, during step 104, are in a ratio ranging between 0.01:1 and 100:1, more preferably are in a ratio of 2:1.

Preferably, the amount of the first solution $SOL_2$ and of the third solution $SOL_3$, during the step 104, are in a ratio ranging between 1:0.01 and 1:100, but more preferably are in a ratio of 1:1.

Preferably, during step 103, the mixing time is at least 10 seconds, more preferably ranging between 1 minute and 5 minutes.

Preferably, during step 103, the speed of mixing is at least 100 r.p.m., more preferably ranging between 200 r.p.m. and 400 r.p.m.; alternatively, the mixing is carried out by means of any other known system, e.g. hydrodynamically.

In general, the mixing during step 103 is preferably carried out under the following conditions:
- concentration of the reagents: the method can be carried out with concentrations ranging between 1 µM and the maximum concentration dictated by the solubility of the salts used (both the salts of the noble metal A and of the transition metal B, and the inorganic salts of the sulphur-based reducing agent C; in its preferred embodiment, the method uses solutions at a concentration ranging between 1 mM and 1 M;
- times: the mixing for step 103 continues until ORP values between 0 and −1 V are recorded, preferably between −600 and −900 mV; generally, the duration of mixing is at least 10 seconds, more preferably ranging between 1 minute and 5 minutes;
- flows: depend on the reactor size and may range between $10^{-3}$ mL/min and $10^6$ mL/min, preferably ranging between 0.05 mL/min and 250 mL/min;
- temperatures: any temperature that allows the existence of a liquid phase, preferably ranging between 10 and 50° C.;
- pressure: any pressure that, together with the temperature referred to in the previous point, allows the existence of a liquid phase;
- pH: ranging between 0 and 14, preferably, between 7 and 12.

Preferably, during step 104, the mixing time is at least 10 seconds, preferably ranging between 5 minutes and 15 minutes.

Preferably, during step 104, the speed of mixing is at least 100 r.p.m., more preferably ranging between 200 r.p.m. and 400 r.p.m.; alternatively, the mixing is carried out by means of any other known system, e.g. hydrodynamically.

In general, the mixing during step 104 is preferably carried out under the following conditions:

- concentration of the reagents: the method can be carried out with concentrations ranging between 1 μM and the maximum concentration dictated by the solubility of the salts used (both the salts of the noble metal A and of the transition metal B, and inorganic salts of the reducing agent C); in its preferred embodiment, the method uses solutions at a concentration ranging between 1 mM and 1 M;
- times: the reaction is stopped when the redox potential of the solution is stabilized at values lower than 0 V, preferably between 0.4 and 1.5-V-; generally, the duration of mixing is at least 10 seconds, more preferably ranging between 5 minutes and 15 minutes;
- flows: depend on the reactor size and may range between $10^{-3}$ mL/min and $10^6$ mL/min, preferably ranging between 0.05 mL/min and 250 mL/min;
- temperatures: any temperature that allows the existence of a liquid phase, preferably ranging between 10 and 50° C.;
- pressure: any pressure that, together with the temperature referred to in the previous point, allows the existence of a liquid phase;
- pH: ranging between 0 and 14, preferably, between 7 and 12.

Preferably, the method according to the present invention occurs in a liquid phase, i.e. in operating temperature and pressure conditions such to allow the existence of a liquid phase, preferably occurring at ambient temperature and pressure.

Preferably, the method according to the present invention occurs in a natural atmosphere or in a controlled atmosphere and with naturally oxygenated or degassed solutions.

Preferably, the noble metal A is selected from silver Ag, gold Au, platinum Pt, palladium Pd and copper Cu; more preferably, the noble metal A is silver Ag.

Preferably, the salt of noble metal A is chosen from nitrates, halides, sulphates, sulphites, acetates, carbonates and bicarbonates, phosphates, phosphites, or a mixture thereof.

Preferably, the transition metal B is chosen from iron Fe, manganese Mn, zinc Zn and nickel Ni; more preferably, the transition metal B is iron Fe and/or manganese Mn.

Preferably, the salt of transition metal B is chosen from nitrates, halides, sulphates, sulphites, acetates, ammonium sulphates, carbonates and bicarbonates, phosphates, phosphites, or a mixture thereof.

Preferably, the inorganic sulphur-based reducing agent C is chosen from sulphites, dithionites, dithionates, bisulphites, metabisulphites, thiosulphates, or a mixture thereof; more preferably, the inorganic sulphur-based reducing agent C is metabisulphite or dithionite.

Preferably, the optional step of mixing the suspension of micro- and nanoparticles with one or more stabilizing agents, such as organic and/or inorganic polymers, surfactants and/or polyelectrolytes, occurs under the following conditions:

- concentration of stabilizing agent compared to that of nanoparticles: preferably, equal to $10^{-3}:10^6$, more preferably equal to 0.01:100;
- times: must be such as to allow the contact between the particles and the stabilizer, as well as the adhesion of the stabilizing agent molecules on the particles; preferably, such contact time is equal to or higher than 5 minutes;
- flow of stabilising agent in the mixture of micro- and nanoparticles: ranging between $10^{-3}$ and $10^6$ mL/min, preferably ranging between 0.1 and 100 mL/min;
- temperatures: must be such that it does not induce degradation of the stabilizing agent in case the latter is a thermolabile organic compound; the preferred range is 10-50° C.;
- pressure: any pressure that, together with the temperature referred to in the previous point, allows the existence of a liquid phase;
- pH: to increase the interaction between the stabilising agent and the particles, it is preferable, but not strictly necessary, adopting a neutral or alkaline pH.

Preferably, the optional step of mixing the suspension of micro- and nanoparticles with one or more porous, organic and/or inorganic supports occurs under the following conditions:

- concentration of porous, organic and/or inorganic supports compared to that of nanoparticles: preferably, equal to $10^{-3}:10^6$, more preferably equal to 0.01:100;
- times: must be such as to allow the contact between the particles and the porous supports, as well as the adhesion of these on said porous supports; preferably, such contact time is equal to or higher than 5 minutes;
- flow of porous supports in the mixture of micro- and nanoparticles: ranging between $10^{-3}$ and $10^6$ mL/min, preferably ranging between 0.1 and 100 mL/min;
- temperatures: any temperature that allows the existence of a liquid phase, preferably ranging between 10 and 50° C.;
- pressure: any pressure that, together with the temperature referred to in the previous point, allows the existence of a liquid phase;
- pH: to increase the interaction between the particles and the porous supports, it is preferable, but not strictly necessary, adopting a neutral or alkaline pH.

Preferably, the optional step of carrying out steps 103 and 104 in the presence of stabilizing agents and/or porous substrates is performed under the following conditions:

- concentrations and flows of the noble metal A, of the transition metal B and of the reducing agent C, pH, temperature, pressure and time: they do not vary with respect to the protocol of the present invention regarding the previous steps 103 and 104;
- concentration of stabilizing agents and/or porous, organic and/or inorganic supports compared to that of nanoparticles produced: preferably, equal to $10^{-3}:10^6$, more preferably equal to 0.01:100;
- flow of stabilizing agents and/or porous supports in the mixture of micro- and nanoparticles: ranging between $10^{-3}$ and $10^6$ mL/min, preferably ranging between 0.1 and 100 mL/min;

Preferably, the optional step of keeping the suspension under stirring for a period of time of at least 5 minutes occurs under the following conditions:

- concentrations of reactants and pH are evolving due to the occurrence of the reduction;
- any additional flows of reagents;
- temperatures: any temperature that allows the existence of a liquid phase, preferably ranging between 10 and 50° C.;
- pressure: any pressure that, together with the temperature referred to in the previous point, allows the existence of a liquid phase.

Preferably, the optional step of letting the Zero-Valent micro- and nanoparticles precipitate takes place under the following conditions:
- at the end of the reaction, the solution contains, besides Zero-Valent particles, also a residue of the reducing agent;
- times: depend on the volume of particles produced and on the specific modes of precipitation; preferably, the precipitation time is such to produce a supernatant with an absorbance value equal to that of water in the range of 400-800 nm;
- temperatures: any temperature that allows the existence of a liquid phase, preferably ranging between 10 and 50° C.;
- pressure: any pressure that, together with the temperature referred to in the previous point, allows the existence of a liquid phase;
- pH: alkaline; it should be noted that the pH does not undergo variations with respect to the value reached at the end of the reaction.

Preferably, the optional step of removing the aqueous phase occurs under the following conditions:
- concentration of reagents: at this stage of the synthesis, the solution presents the micro- and nanoparticles segregated in an area of the reactor and the supernatant containing possible residual reagents;
- times and flows: the removal of the aqueous phase should be carried out at a certain speed—and thus, with certain flows—such as not to induce the resuspension of particles and their elimination from the solution; such times are thus dependent on the type of particles and on their eventual stabilization;
- temperatures: any temperature that allows the existence of a liquid phase, preferably ranging between 10 and 50° C.;
- pressure: any pressure that, together with the temperature referred to in the previous point, allows the existence of a liquid phase;
- pH: does not undergo variations with respect to the value reached at the end of the reaction.

Preferably, the optional step of washing the precipitated Zero-Valent micro- and nanoparticles with deionised water takes place under the following conditions:
- concentration of the reactants: tends to zero during the execution of the stated number of washing cycles;
- times: every washing cycle provides for the suspension and the complete particle redeposition, and depends, therefore, on their composition and on the possible stabilization;
- flows: each washing cycle is carried out with a volume of distilled water equal to the volume of the previously removed solution;
- temperatures: any temperature that allows the existence of a liquid phase, preferably ranging between 10 and 50° C.;
- pressure: any pressure that, together with the temperature referred to in the preceding point, allows the existence of a liquid phase; the pH gets values gradually tending to neutrality.

Furthermore, Zero-Valent micro- and nanoparticles, comprising a noble metal A and transition metal B obtained by means of the method described above, form an independent and independently usable aspect compared to other aspects of the invention.

Preferably, the Zero-Valent micro- and nanoparticles include silver as a noble metal A and iron and/or manganese as a transition metal B.

Preferably, the micro- and nanoparticles exhibit one or more of the following characteristics:
- they are bimetallic;
- they contain a layer of oxide of the transition and/or noble metal used during the synthesis on the surface;
- they are embedded in a crystalline matrix made of sulphides or sulphites or sulphates of the transition metal B and/or the noble metal (A).

Preferably, the micro- and nanoparticles are covered by and/or are embedded in and/or are coupled to another material selected from activated carbons, graphene, inorganic oxides and/or hydroxides, polymeric materials and/or organic and/or inorganic compounds.

Preferably, the microparticles have an average size smaller than 100 µm and the nanoparticles have an average size smaller than 100 nm.

Furthermore, a method for the remediation and/or treatment of contaminated water, including at least one polluting substance, forms an independent and independently usable aspect compared to other aspects of the invention.

This method comprises the steps of:
- providing a suspension of Zero-Valent micro- and nanoparticles comprising a noble metal A and a transition metal B as described above;
- if necessary, stabilizing the suspension of micro- and nanoparticles by adding one or more stabilizing agents, such as organic and/or inorganic polymers, surfactants and/or polyelectrolytes;
- mixing the contaminated water with the suspension to induce contact between the micro- and nanoparticles and the polluting substance, and consequently to remove, degrade and/or transform the polluting substance itself and/or create an environment conducive to the removal of the polluting substance.

According to a first preferred embodiment of the invention, contaminated water is wastewater or a surface water body, and wherein the mixing step can take place in natural geological formations or in flumes, basins or artificial tanks.

According to another preferred embodiment of the invention, contaminated water is subsurface water, located both in the saturated and vadose zone and wherein the contact among said micro- and nanoparticles and the water containing the polluting substance is carried out by injection techniques.

Furthermore, a method for the reduction of a transition metal B to a Zero-Valent metal forms an independent and independently usable aspect compared to other aspects of the invention.

This method comprises the following steps:
- preparing a first aqueous solution $SOL_1$ of a salt of a noble metal A;
- preparing a second aqueous solution $SOL_2$ of a salt of a transition metal B;
- preparing a third neutral or basic aqueous solution $SOL_3$ of an inorganic sulphur-based reducing agent (C) in stoichiometric excess with respect to the reduction reaction to Zero-Valent of the total amount of the metals A e B contained in $SOL_1$ and $SOL_2$;
- pre-reducing the noble metal A by mixing said first solution $SOL_1$ and a first aliquot of said third solution $SOL_3$, wherein the amounts of said first and third solutions are in a predetermined ratio to each other, and wherein the amount of the inorganic reducing agent C is in stoichiometric excess in the reduction reaction to Zero-Valent of the salt of noble metal A contained in the first solution $SOL_1$; and reducing the transition metal B to a Zero-Valent metal by adding said second solution $SOL_2$ and a second aliquot of said third solution $SOL_3$ to the mixture containing the pre-reduced noble metal A, wherein the amounts of said third solution and said second solution are in a predetermined ratio to each other, and wherein the amount of the reducing agent C is in stoichiometric excess in the reduction reaction to Zero-Valent of the salt of transition metal B contained in the second solution $SOL_2$.

Preferably, the noble metal A is silver, the transition metal B is iron and/or manganese and the inorganic sulphur-based reducing agent C is chosen from sulphites, dithionites, dithionates, bisulphites, metabisulphites, thiosulphates, or a mixture thereof, more preferably it is metabisulphite or dithionite.

The technical solution according to the present invention is described below in greater detail with reference to the following Examples, which have been developed on the basis of experimental data and which are intended as illustrative, but not limiting, of the present invention.

Adopted Solutions

The solutions of the metal salts can be obtained from any soluble salt, such as for example chloride, nitrate, sulphate, and etcetera.

The solutions of the noble metal and the transition metal salts may contain other solutes, pH modifiers, surfactants, natural polymers, colloids.

The reducing agent solution may consist of any inorganic sulphur-based reducing agent, preferably it contains metabisulphite or dithionite; it may contain other solutes, pH modifiers, surfactants, natural polymers, colloids.

Synthesis Method

The mixing of the solutions is performed in an open reactor, in an un-controlled atmosphere, under mechanical or magnetic stirring and in a basic environment.

The solutions of metal salts can be injected simultaneously or at different times with respect to the inorganic reducing agent solution and may precede or follow the addition of the reducing agent solution.

The solution of the transition metal salt should come into contact with the reducing agent solution necessarily in the presence of the noble metal, as a dissolved salt or in already reduced form.

Example 1

An example of an embodiment concerns the synthesis of Zero-Valent iron nanoparticles catalysed by pre-reduction of silver carried out by an inorganic reducing agent, the same or different from the one used to obtain the iron reduction. The synthesis of the bimetallic iron-silver nanoparticles was obtained following the present protocol:

mixing 15 mL of a 2.4 mg/L $AgNO_3$ solution with 5 mL of a sodium dithionite solution having a pH modified to 10 by adding an alkaline base: the reduction of $Ag^+$ to $Ag^{(0)}$ and a lowering of the redox potential (pE) of the solution up to values close to the redox potential of the couple $Ag^+/Ag^{(0)}$ of about −0.8 V are obtained;

adding 15 mL of a 10 mg/L solution of $FeSO_4$ and a second aliquot of sodium dithionite (5 mL): the formation of black iron particles having an extremely magnetic character occurs;

checking the amount of iron, as compared to stoichiometric products, it is possible to modify the magnetic properties and the product reactivity;

optionally, further adding of dithionite for a complete transformation of salts;

optionally, washing the precipitate in deionized water (not necessarily degassed) for the purpose of characterization.

Morphological and Compositional Characterisation

Figure 3:
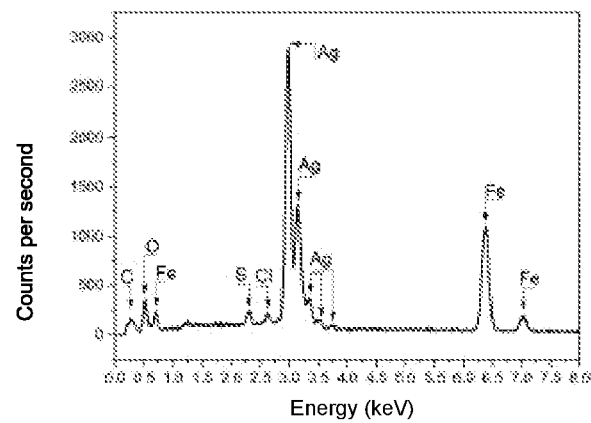
FIG. 3 is a graph showing the EDS (Energy Dispersive X-Ray Spectrometry) spectrum of a sample of bimetallic iron and silver micro- and nanoparticles produced according to the present invention.

Referring to FIG. 3, the EDS (Energy Dispersive X-ray Spectrometry) spectrum of a sample of bimetallic micro- and nanoparticles of iron and silver produced according to the present invention is shown; the peak areas concerning the different elements are directly related to the molar concentration of the same.

It is noted that the micro- and nanoparticles produced are mainly composed of Zero-Valent silver and iron; such conclusion derives from the assessment of the stoichiometric ratio between oxygen and metal for the various forms of iron oxides ($Fe^{II}O$, $Fe^{III}_2O_3$, $Fe^{II}Fe^{III}_2O_4$); actually, from the integration of the peaks in the graph in FIG. 3, a molar ratio of Fe/O=2.87 is obtained, sufficient to justify the presence of at least 65% of iron in the Zero-Valent form; therefore, the oxygen peak is attributed to the oxide layer present on some particles, to needle-shaped crystals and to reducing agent residues (dithionite, $S_2O_4$ which leads to $SO_3$), that is also responsible for the sulphur peak; instead, the carbon peak derives from the tube holder used during the measurement.

Figure 8:
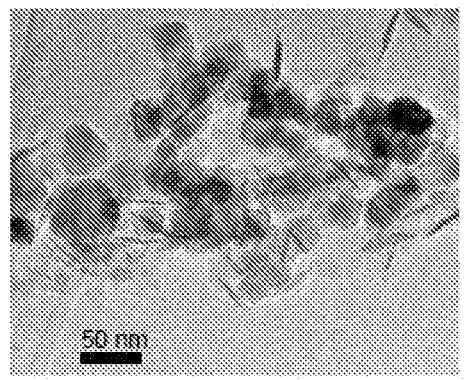
FIG. 8 is a TEM (Transmission Electron Microscope) image illustrating bimetallic iron and silver nanoparticles (darker ones) produced according to the present invention and in which iron (needle-shaped) oxides may be distinguished, a by-product of the reduction reaction of iron.
Figure 9:
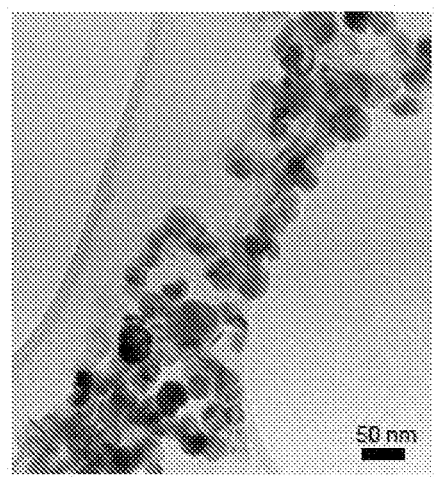
FIG. 9 is a TEM (Transmission Electron Microscope) image illustrating bimetallic iron and silver nanoparticles (darker ones) produced according to the present invention.

Referring to FIG. 8 and to FIG. 9, the morphology of the iron and silver (darker) particles obtained according to the present invention with the synthesis protocol described in example is observed; in such figures, it is also possible to distinguish iron oxides (needle-shaped), which represent the by-product of the iron reduction reaction; Zero-Valent particles have a spheroidal shape and dimensions ranging between 20-60 nm, with an average value of 45 nm.

Figure 10:
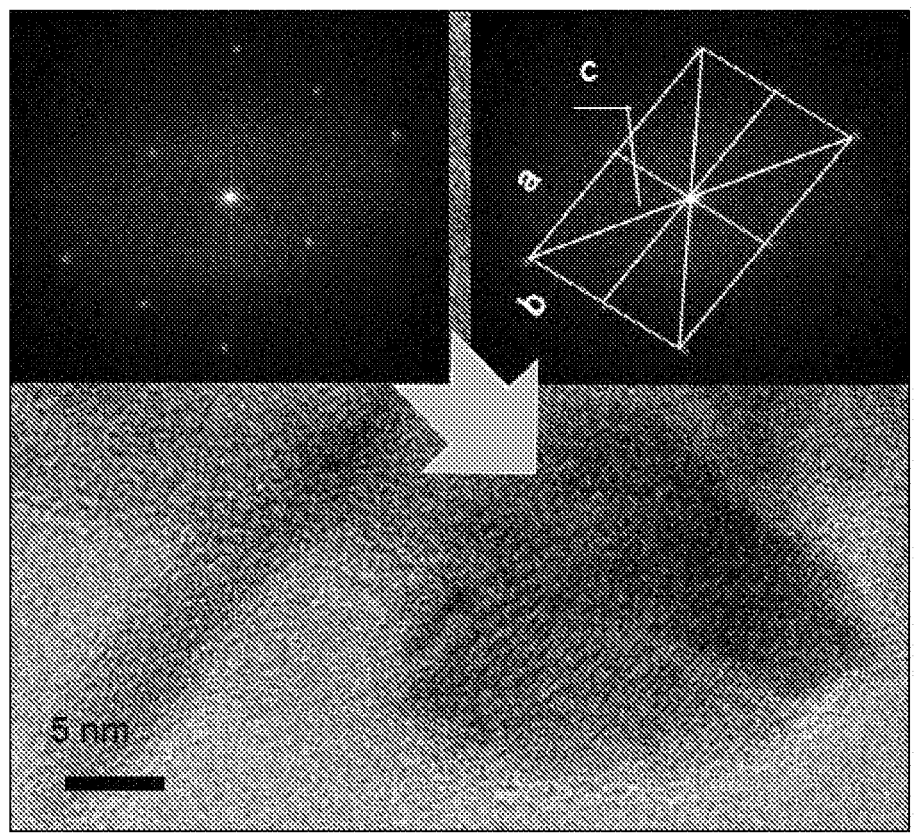
FIG. 10 is a high magnification TEM (Transmission Electron Microscope) image of a nanoparticle produced according to the present invention; it should be noted that the top-left insert depicts a representation in the Fourier transform of the particle indicated by the arrow; from such image, it is possible to obtain the a, b, c parameters relevant to the crystal lattice of the particle (top-right insert), which identify the crystalline state of iron in the particle under examination; the parameter triads for known crystalline phases of the various elements are shown in databases, which are part of the basic knowledge in the field.

With reference to FIG. 10, representing the diffraction grating obtained by the Fourier transform of the TEM (Transmission Electron Microscope) image, it is possible to compare the triad of reticular distances "a, b, c" (in Angstroms, Å) with tabulated data available in the literature (NBS Monograph—Standard X-Ray Powder Diffraction Patterns), and, thus, to trace back the crystalline phase of the particle; in the case shown, the triad [1.87; 1.12; 0.94] Å is located at Zero-Valent iron (triad [2.027, 1.443, 1.17] Å), while the oxides have two of the grating distances always higher than 2 Å.

Characterization of Reactivity

Preliminary tests on the degradation of bromophenol blue, a persistent dye, were carried out in the presence of bimetallic micro- and nanoparticles produced according to the present invention; the results were compared with the degradative properties of the particles consisting of silver only or iron only, produced according to variants of the present method.

Figure 4:
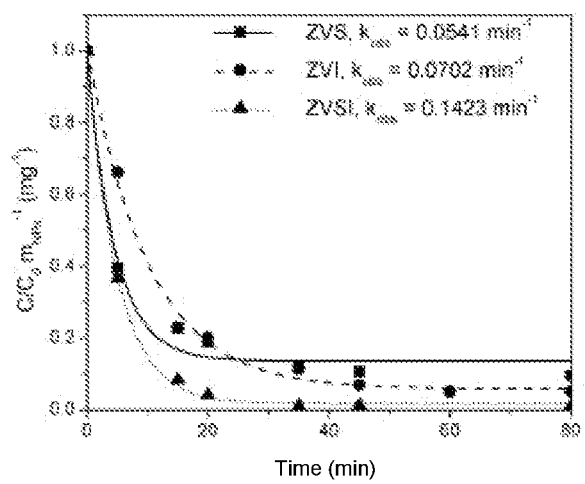
FIG. 4 is a graph showing the different kinetics of degradation of bromophenol blue obtained in the presence of bimetallic iron and silver micro- and nanoparticles (ZVSI) produced according to the present invention, and in the presence of iron-only (ZVI) and silver-only (ZVS) micro- and nanoparticles produced by means of the same process of the invention, except for steps 104 and 103, respectively.

Referring to FIG. 4, the different degradation kinetics of bromophenol blue obtained in the presence of monometallic and bimetallic micro- and nanoparticles can be observed, in which ZVSI indicates the material obtained according to the method of the invention, namely according to the method wherein, during step 104, the mixing time is at least 10 seconds, preferably ranging between 5 minutes and 15 minutes;

ZVS indicates a material obtained with the same identical method used to obtain ZVSI, but without the addition of the transition metal;

ZVI indicates a material obtained with the same identical method used to obtain ZVSI, but without the addition of the noble metal.

In particular, the graph shows that the different materials exhibit different degradation kinetics and efficiencies; the dotted curve (symbol: ▲) shows the variation of the dye concentration due to the presence of the bimetallic particles; the dye removal efficiency was greater than 95%, and the complete degradation of the dye was achieved in less than 40 minutes; the degradation kinetics resulted to be higher than those of the iron-only particles (dashed curve; symbol: •) or Zero-Valent silver-only ones (solid curve, symbol: ■) at the same concentration of the products in the presence of dithionite.

Figure 5:
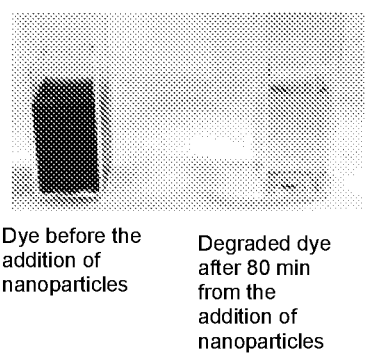
FIG. 5 is a photograph illustrating the initial and final point of the degradation of bromophenol blue in the presence of micro- and nanoparticles, specifically bimetallic iron and silver micro- and nanoparticles, according to the present invention.

Both ZVS and ZVI also have removal efficiencies slightly lower than the ZVSI ones. Referring to FIG. 5, the visual change is also shown in the colouration of the dye solution treated with the ZVSI produced according to the present invention, from very intense at the beginning of the reaction to almost colourless at the end.

Comparison of Synthesis Methods

The synthesis method preferred, used for the sample C_0, is carried out in the following way:

A. preparing $SOL_1$ (containing the noble metal A), $SOL_2$ (containing the transition metal B) and $SOL_3$ (containing the inorganic sulphur-based reducing agent C); $SOL_3$ is in an alkaline environment, at pH>7, better if at pH>10, even better if at pH>12; C:OH mol/mol ratio<0.25;
B. mixing $SOL_1$ with an aliquot of $SOL_3$, A:C mol/mol ratio at least equal to 2, better if A:C<2, even better if A:C<0.5, preferred A:C=0.01;
C. mixing of $SOL_2$ in the reaction environment with an A:B mol/mol ratio lower than 1, preferred A:B=0.003;
D. mixing a second aliquot of $SOL_3$ in the reaction environment with a $B:C_T$ (total concentration of reducing agent) mol/mol ratio of at least 1, better if $B:C_T<1$, even better if $B:C_T<0,5$, preferred $B:C_T=0.3$.

As a comparison, some other methods have been implemented, eliminating reagent additions, varying the stoichiometric ratios or the sequence of addition:

Method used for the sample C_1: the addition of $SOL_1$ was excluded, and the process has provided for $SOL_3$+$SOL_2$+$SOL_3$ leaving $B:C_T$ unchanged, where $C_T$ includes also the previously added aliquot.

Method used for sample C_2: the absolute stoichiometric ratios were left unchanged with respect to the protocol for sample C_0, but the sequence of addition was changed as follows:
mixing $SOL_1$ with a volume of $SOL_3$ given by the sum of steps A and D of the protocol for sample C_0;
mixing $SOL_2$.

Method used for sample C_3: the absolute stoichiometric ratios were left unchanged with respect to the protocol for sample C_0, but the sequence of addition was changed as follows:
mixing $SOL_1$ with $SOL_2$ in the previous stoichiometric ratios;
mixing $SOL_3$ in the previous stoichiometric ratios.

Method used for sample C_4: same mixing sequence, but with the doubling of the volume of dithionite for every step, i.e.
mixing $SOL_1$ with $SOL_3$ so that to obtain A:C=0.0062;
mixing $SOL_2$ so that to obtain A:B=0.0035;
mixing $SOL_3$ so that to obtain $B:C_T=0.176$.

The method used for the sample C_5: same mixing sequence, but with the halving of the volume of dithionite for every step, i.e.
mixing $SOL_1$ with $SOL_3$ so that to obtain A:C=0.0246;
mixing $SOL_2$ so that to obtain A:B=0.0035;
mixing $SOL_3$ so that to obtain $B:C_T=0.779$.

Method used for the sample C_6: same stoichiometric ratios, but mixing inversion of metal solutions, i.e.:
mixing $SOL_2$ with an aliquot of $SOL_3$ so that to obtain A:C=0.389 (note that the reference to $A:C_T$ no longer applies because, in this case, it is the first mixing, which excludes the previously present aliquot since added to $SOL_1$);
mixing $SOL_1$ so that to obtain A:B=0.0035 and $A:C_T=0,00123$ (again, in this case, the stoichiometric ratio is referred to the total amount of reducing agent added so far).

The properties of micro- and nanoparticles were determined through a degradation test by taking the same volume of particles (not necessarily the same mass) from their homogeneous suspension on a dye at an equal concentration; tests were performed on equal volumes, in equal and parallel reactors after an identical washing for all types of particles.

Figure 6:
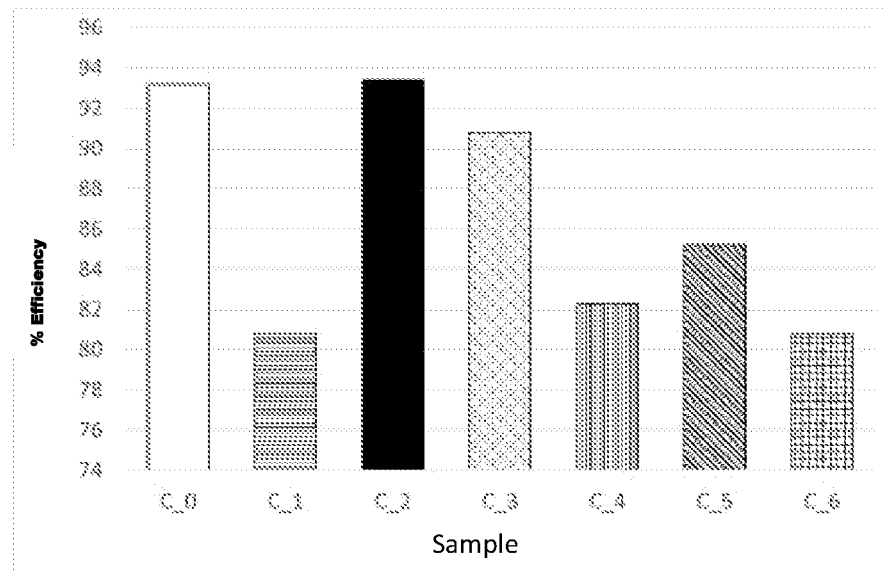
FIG. 6 is a bar graph showing the efficiency of degradation of bromophenol blue obtained in the presence of bimetallic iron and silver micro- and nanoparticles (ZVSI) produced according to the present invention, and in the presence of other particles produced according to variants of the present process.
Figure 7:
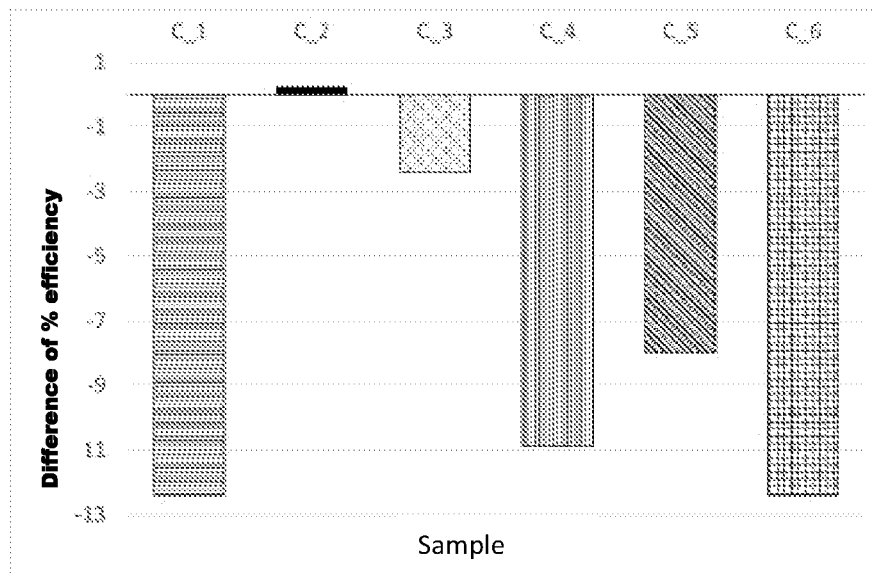
FIG. 7 is a bar graph showing the difference of efficiency percentage of degradation of blue bromophenol obtained in the presence of bimetallic iron and silver micro- and nanoparticles (ZVSI) produced according to the present invention, and in the presence of other particles produced according to variants of the present process.

The results expressed in terms of absolute degradation efficiency are shown in FIG. 5. Referring to FIG. 6, in which the results expressed in terms of absolute degradation efficiency are given as the efficiency difference with respect to the preferred protocol (sample C_0), samples C_0 and C_1 show to result in products having similar degradation performances of the used dye, while sample C_3 has slightly lower performances; all other products have performances lower than the reference sample C_0, as shown in FIG. 7.

It is therefore apparent that both the addition sequence and the stoichiometric ratios among reagents are decisive for the outcome of the reaction.

Ranges of Values for the Application of the Method with Sulphur-Based Reducing Agents Hereinbelow, the ranges of values according to the preferred embodiment of the method according to the present invention that provides for:
silver Ag as a noble metal
iron Fe as a transition metal, and
dithionite as a reducing agent.

However, it should be specified that such indication is not in any way binding, and the fact that variants of the method could lead to particles with equally good removing performances is not denied.

Figure 11:
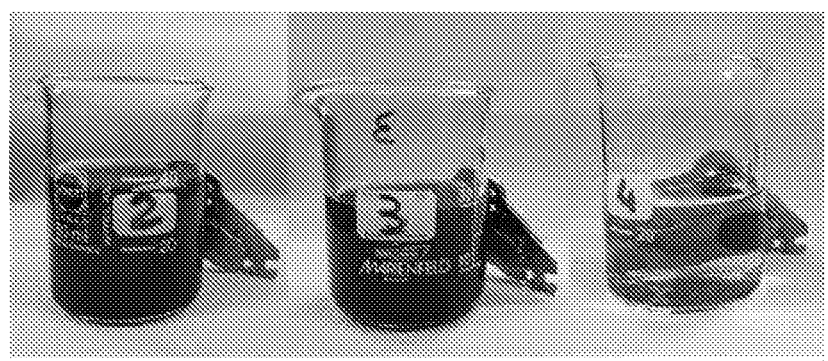
FIG. 11 is a photograph of three samples of iron-based Zero-Valent particles produced with three different methods of synthesis: synthesis of sample "2" by means of black tea extracts as a reducing agent; synthesis of sample "3" by means of green tea extracts as a reducing agent; synthesis of sample "4" by means of sodium dithionite as inorganic sulphur-based reducing agent according to the method of the present invention; all samples are placed in contact with a permanent magnet to check the ferromagnetic properties of the particles, index of the Zero-Valent iron content.

As above said, the value ranges according to the preferred embodiment of the method according to the present invention are:
pH quantitative ranges: ranging 10 to 12
mol/mol ratios of noble metal A and transition metal B solutions: maximum value=2, minimum value=0.0005, optimal value=0.1-0.001
quantitative ranges of the dithionite stoichiometric excesses:
stoichiometric dithionite: needed for the reduction of two metals; for example, in the case of Zero-Valent reduction of $Ag^{1+}$ and $Fe^{2+}$, dithionite needed=1*mol Ag+2*mol Fe;
preferred excess ranges compared to the stoichiometric ratio: 1 to 100 times the stoichiometric ratio, better if 1 to 10 times, still better if 2 to 5;
minimum mixing times:
noble metal A+dithionite mixing=10 seconds, preferably more
transition metal B+dithionite addition=10 seconds, preferably 5 min or more
temperature at 1 atm: 1-99° C. (the whole stability range of liquid water), better if at ambient temperature and pressure, i.e. 15-30° C. at 1 atm Comparison between Inorganic Sulphur-based Reducing Agents and Plant Extracts Hereinbelow, the comparison of methods for the synthesis based on the application of reducing agents and protocols different from those of the present invention. In particular, FIG. 11 shows three photographs regarding three samples of particles based on Zero-Valent iron, produced according to the following procedures:

Sample "2": mixing 15 mL of a 10 mg/L solution of $FeSO_4$ with 25 mL of a black tea extract; the black tea solution was obtained by placing in infusion 2 g of dried leaves in 100 mL of deionized water at 90° C. for 20 min;

Sample "3": mixing 15 mL of a 10 mg/L solution of $FeSO_4$ with 15 mL of a green tea extract; the green tea solution was obtained by placing in infusion 2 g of dried leaves in 100 mL of deionized water at 90° C. for 20 min;

Sample "4": obtained according to the preferred protocol of the invention described in the previous Example 1.

In all three cases described above, the application of the protocol has led to the synthesis of a black coloured particulate suspension, typical of the efficient production of Zero-Valent iron-based particles. After the synthesis, all three beakers containing particles were placed in contact with a magnet for 15 minutes, with the aim of exploiting the ferromagnetic properties typical of Zero-Valent iron particles in order to obtain a magnetic separation of the particles themselves from the dispersing fluid. Referring to FIG. 11, it is observed that in samples "2" and "3", the particles are still in suspension at the end of 15 minutes, not undergoing the magnet effect. On the contrary, in sample 3, the particles produced according to the present invention resulted effectively separated from the dispersing liquid due to the magnet effect. Magnetic separation was possible thanks to the strong ferromagnetic behaviour of the produced particles, relatable to the presence of significant quantities of iron at Zero-Valent state. Such comparison allowed to demonstrate that, although at a first visual analysis the appearance of the particles results similar for all tested methods, only the method of the present invention allows the quick and effective formation of particles with a high content of Zero-Valent iron. In addition, the use of inorganic sulphur-based reducing agents limits the presence of organic macromolecules (typically present in plant extracts) within the suspension produced that, being absorbed on the particle surface, could reduce the reactivity thereof and, consequently, its performances as a remediating agent.

As it may be deduced from the foregoing, the innovative technical solution described herein exhibits the following advantageous features:

production of Zero-Valent metal micro- and nanoparticles by means of a chemical reduction of metallic salts performed in extremely simplified operating conditions (usage of non-deaerated water, open reactor) and without the use of $NaBH_4$, with consequent elimination of risks associated with the production of gaseous $H_2$ and the formation of borates;

possibility of obtaining the reduction to the Zero-Valent state of transition metals, also using less strong reducing agents that, under operating conditions different from those of the present invention, would not be able to perform the reduction to Zero-Valent state of the transition metals themselves;

use of inorganic sulphur-based reducing agents, which present lower costs and environmental impact compared to the commonly used inorganic reducing agents (e.g. $NaBH_4$) and which allow to obtain particles free of organic impurities and with a higher content of Zero-Valent metals with respect to reducing agents of plant origin;

production of bimetallic micro- and nanoparticles, preferably consisting of iron and silver, with removal performances significantly better than those of the two single materials produced by means of the same synthesis protocol;

obtainment, in the presence of silver, of a material that combines the antibacterial and catalytic properties of silver with the reducing and adsorbent properties of the transition metal;

environmental benefit, linked to the use of a reducing agent at high environmental compatibility (dithionite), which does not lead to the formation of toxic by-products, with consequent economic and social benefits associated;

economic advantage, due to the use of dithionite, whose extremely low cost can greatly reduce the unit cost of the Zero-Valent iron particles produced;

technological advantage, thanks to the production of bimetallic particles consisting of a transition metal and a noble metal, which gives the produced particles an excellent reducing property against contaminants, catalysed by the presence of the noble metal, as well as antibacterial properties;

technical and economic advantage, due to the fact that the addition of a noble metal in the Zero-Valent micro- and nanoparticles, which in the present invention has also the function to promote the synthesis of the transition metal (e.g. iron), occurs directly during the synthesis of the micro- and nanoparticles themselves, allowing to further simplify the production process of the functionalized particles;

technical and economic advantage, linked to the possibility to perform the synthesis process in very simple operating conditions, without the need of degassing the solutions and generating a controlled atmosphere into the reactor;

reduction of a noble metal, preferably silver, in order to generate extremely favourable reducing conditions to the subsequent or concurrent reduction of a transition metal, preferably iron or manganese;

possibility to perform the synthesis of a Zero-Valent metal in a short time in the presence of a non-inert atmosphere and non-degassed water;

synthesis of bimetallic micro- and nanoparticles, preferably consisting of iron and silver, with removal performances significantly higher than those of the two single materials produced by means of the same synthesis protocol;

possibility of controlling the properties of the product obtained by modifying the stoichiometric ratios among reactants, the addition and mixing rates of the same;

flexibility of the method, which allows the synthesis of bimetallic particles on substrates, filters or within different matrixes (e.g., activated charcoal) quickly and with a reduced technological complexity.

From the description hereinabove, therefore, it is apparent how the methods and the Zero-Valent metal micro- and nanoparticles according to the present invention allow to achieve the intended objects.

Therefore, it is apparent to a person skilled in the art that it is possible to make modifications and further variants to the solution described with reference to the accompanying

The invention claimed is:

1. A method for the synthesis of Zero-Valent metal micro- and nanoparticles, comprising the following steps:
   preparing a first aqueous solution (SOL1) of a salt of a noble metal (A), said first solution having the characteristic of being degassed or naturally oxygenated (step 100);
   preparing a second aqueous solution (SOL2) of a salt of a transition metal (B), said second solution having the characteristic of being degassed or naturally oxygenated (step 101);
   preparing a third neutral or basic aqueous solution (SOL3), said third solution having the characteristic of being degassed or naturally oxygenated, of an inorganic sulphur-based reducing agent (C) in stoichiometric excess with respect to the reduction reaction to Zero-Valent of the total amount of the metals (A e B) contained in the first aqueous solution (SOL1) and in the second aqueous solution (SOL2) (step 102);
   in presence of natural atmosphere or controlled atmosphere, mixing said first solution (SOL1) and an aliquot of said third solution (SOL3), wherein the amount of said third solution is determined to obtain that the amount of the inorganic reducing agent (C) is in stoichiometric excess in the reduction reaction to the Zero-Valent form of the salt of the noble metal (A) contained in the first solution (SOL1), thus obtaining a suspension of micro- and nanoparticles of noble metal (A) (step 103);
   adding said second solution (SOL2) and a second aliquot of said third solution (SOL3) to a mixture obtained in the previous step 103, wherein the amount of said third solution is determined to obtain that the amount of the inorganic reducing agent (C) within the mixture is in stoichiometric excess in the reduction reaction to the Zero-valent form of the salt of the transition metal (B) contained in the second solution (SOL2), and mixing, thus obtaining a suspension of Zero-Valent micro- and nanoparticles at least of the transition metal (B) (step 104),
   wherein said noble metal (A) is selected from silver (Ag), gold (Au), platinum (Pt), palladium (Pd) and copper (Cu) and wherein said transition metal (B) is selected from iron (Fe), manganese (Mn), zinc (Zn) and nickel (Ni).

2. The method according to claim 1, wherein said inorganic sulphur-based reducing agent (C) is chosen from sulphites, dithionites, dithionates, bisulphites, metabisulphites, thiosulphates, or a mixture thereof.

3. The method according to claim 1, wherein said step 103 and said step 104 occur simultaneously.

4. The method according to claim 1, further comprising one or more of the following steps:
   mixing the suspension of micro- and nanoparticles of noble metal (A) or the suspension of Zero-Valent micro- and nanoparticles with one or more stabilizing agents;
   mixing the suspension of micro- and nanoparticles of noble metal (A) or the suspension of Zero-Valent micro- and nanoparticles with one or more porous, organic and/or inorganic supports;
   carrying out said steps 103 and 104 in the presence of stabilizing agents and/or porous supports.

5. The method according to claim 4, wherein the stabilizing agent is selected from an organic and/or inorganic polymer, surfactant and/or polyelectrolyte; and wherein the porous, organic and/or inorganic support is selected from an activated carbon, zeolite, or ceramic support.

6. The method according to claim 1, wherein, during said steps 103 and 104, the amount of the reducing agent (C) is greater than 0.1 times compared to the stoichiometric amount necessary for the reduction reaction to Zero-Valent of both the salt of noble metal (A) contained in the first solution (SOL1) and the salt of transition metal (B) contained in the second solution (SOL2).

7. The method according to claim 1, wherein said third solution (SOL3) has a pH value ranging between 6 and 14.

8. The method according to claim 7, wherein, during said step 102 and/or during said step 103 and/or during said step 104, an acid or a base is added to reach or maintain said pH value.

9. The method according to claim 1, wherein, during said step 104, the amounts of said noble metal (A) and said transition metal (B) have a molar ratio lower than 2.

10. The method according to claim 1, wherein the amounts of said first solution (SOL1) and third solution (SOL3), during said step 103, are in a ratio varying from 1:0.01 and 1:100.

11. The method according to claim 1, wherein the amounts of said second solution (SOL2) and said third solution (SOL3), during said step 104, are in a volume ratio varying from 0.01:1 and 100:1.

12. The method according to claim 1, wherein, during said step 103, the mixing time is at least 10 seconds.

13. The method according to claim 1, wherein the step of adding said second solution (SOL2) and a second aliquot of said third solution (SOL3) to the mixture obtained in the previous step 103 includes mixing for a mixing time of at least 10 seconds.

14. The method according to claim 1, wherein the operating temperature and pressure conditions are such to allow the existence of a liquid phase.

15. The method according to claim 1, wherein
   said noble metal (A) is silver;
   said transition metal (B) is iron and/or manganese;
   said reducing agent (C) is dithionite.

16. A method for reducing a transition metal (B) to Zero-Valent metal, comprising the following steps:
   preparing a first aqueous solution (SOL1) of a salt of a noble metal (A);
   preparing a second aqueous solution (SOL2) of a salt of a transition metal (B);
   preparing a third neutral or basic aqueous solution (SOL3) of an inorganic sulphur-based reducing agent (C) in stoichiometric excess with respect to the reduction reaction to Zero-Valent of the total amount of the metals (A e B) contained in the first aqueous solution (SOL1) and in the second aqueous solution (SOL2);
   pre-reducing the noble metal (A) by mixing said first solution (SOL1) and a first aliquot of said third solution (SOL3), wherein the amounts of said first and third solutions are in a predetermined ratio to each other, and wherein the amount of the reducing agent (C) is in stoichiometric excess in the reduction reaction to Zero-Valent of the salt of noble metal (A) contained in the first solution (SOL1); and
   reducing the transition metal (B) to a Zero-Valent metal by adding said second solution (SOL2) and a second aliquot of said third solution (SOL3) to a mixture containing the pre-reduced noble metal (A), wherein the amounts of said third solution and said second solution are in a predetermined ratio to each other, and wherein the amount of the reducing agent (C) is in stoichiometric excess in the reduction reaction to Zero-Valent of the salt of transition metal (B) contained in the second solution (SOL2), wherein said noble metal (A) is silver, wherein said transition metal (B) is iron and/or manganese, and wherein said inorganic sulphur-based reducing agent (C) is selected from sulphites, dithionites, dithionates, bisulphites, metabisulphites, thiosulphates, or a mixture thereof.

* * * * *